United States Patent [19]
Seybold et al.

[11] Patent Number: 6,005,973
[45] Date of Patent: *Dec. 21, 1999

[54] COMBINED DICTIONARY BASED AND LIKELY CHARACTER STRING METHOD OF HANDWRITING RECOGNITION

[75] Inventors: John L. C. Seybold, Portola Valley; Chris A. Kortge, Palo Alto, both of Calif.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/898,633

[22] Filed: Jul. 22, 1997

Related U.S. Application Data

[63] Continuation of application No. 08/240,410, May 10, 1994, abandoned, which is a continuation-in-part of application No. 08/160,519, Dec. 1, 1993, abandoned.

[51] Int. Cl.$^6$ .................................................. G06K 9/00
[52] U.S. Cl. .......................................... 382/187; 382/229
[58] Field of Search .................................... 382/188, 189, 382/187, 229, 230, 186

[56] References Cited

U.S. PATENT DOCUMENTS

| | | | |
|---|---|---|---|
| 4,058,795 | 11/1977 | Balm | 382/40 |
| 4,672,677 | 6/1987 | Yamakawa | 382/13 |
| 4,914,709 | 4/1990 | Rudak | 382/57 |
| 5,062,143 | 10/1991 | Schmitt | 382/40 |
| 5,067,165 | 11/1991 | Nisuida | 382/40 |
| 5,151,950 | 9/1992 | Hullender | 382/13 |
| 5,161,245 | 11/1992 | Fenick | 382/40 |

FOREIGN PATENT DOCUMENTS

| | | |
|---|---|---|
| 59-106083 | 6/1984 | Japan . |
| 60-68484 | 4/1985 | Japan . |
| 60-238986 | 11/1985 | Japan . |

OTHER PUBLICATIONS

Sklarew et al "Handwritten Data Entry into a Computer" presented by LINUS Technologies, Inc. Reston, Virginia, Jun. 1989.

Sklarew et al., "Handwritten Data Entry into a Computer", presented by LINUS Technologies, Inc.—Reston, Virginia, Jun. 1989.

*Primary Examiner*—Yon J. Couso
*Attorney, Agent, or Firm*—Terri S. Hughes

[57] ABSTRACT

In a handwriting recognition process, a list of candidate recognized words is identified (202) as a function of both comparison of dictionary entries to various combinations of recognized character combinations, and through a most likely character string and most likely string of digits analysis as developed without reference to the dictionary. The process selects (301) a word from the list and presents (302) this word to the user. The user then has the option of displaying (303) this list. When displaying the list, candidate words developed with reference to the dictionary are displayed in segregated manner from the most likely character string words and the most likely string of digits. The user can charge the selected word by choosing from the list, or edit the selected word. When the user selects the most likely character string as the correct representation of the handwritten input to be recognized, the process automatically updates (310) the dictionary to include the most likely character string The same process can occur when the user selects the most likely string of digits.

19 Claims, 4 Drawing Sheets

100

COMBINED DICTIONARY BASED AND LIKELY CHARACTER STRING METHOD OF HANDWRITING RECOGNITION

This is a continuation of application Ser. No. 08/240,410, filed May 10, 1994 and now abandoned, which is a continuation in part of patent application, Ser. No. 08/160,519, filed on Dec. 1, 1993now abandoned, herein incorporated by reference.

FIELD OF THE INVENTION

This invention relates generally to handwriting recognition.

BACKGROUND OF THE INVENTION

So called personal digital assistants, such as the EO™ and Newton™ products, typically have a touch sensitive screen upon which a user can impose handwriting. These devices then function to digitize the handwritten character input. Other devices, which function to receive handwritten input include, but are not limited to the following: desktop computers, modems, pagers, advanced telephones, digital or interactive televisions, and other information processing devices having access to a digitizing tablet that can accept handwritten character input. Still other devices can receive handwritten character input by means of a facsimile or scanned input. _These devices process the information to attempt to recognize the information content of the handwritten character input and display that information to the user for purposes of feedback and correction of errors in the processing and recognition of the handwritten character input.

Pursuant to another prior art approach, a dictionary is accessed and entries within the dictionary are compared against the initial handwriting analysis results. Using this approach, one seeks those entries within the dictionary that most closely fit the characteristics of the handwriting sample. For use with handwriting samples that represent information contained within the dictionary, this approach works reasonably well. Often, however, the handwriting input will not be in the dictionary. For example, proper names, geographic locations, acronyms, and professional jargon are typically not included within such dictionaries. Expanding the dictionary to include virtually all words and acronyms, on the other hand, presently constitutes an unsatisfactory solution, since the amount of memory required, and the computational overhead necessary to support a full search of such an extensive dictionary, all make this approach impractical.

Another problem associated with the prior art is the recognition of numeric handwritten input. Many numbers bear a strong resemblance to words that may be in the dictionary (for example, "15" may be easily confused with "is"). A dictionary based system will be unable to correctly identify "15" when written. Accordingly, a need exists for some method to allow this input to be identified correctly and presented to the user as a possible translation of the handwritten character input.

Another problem often associated with the prior art handwriting recognition techniques of the prior art is the format in which the digitized handwritten alphanumeric input is displayed to the user after the input has been analyzed. In particular, prior art methods for displaying the output are confusing when the output contains errors. In many cases, users cannot remember what they wrote and are unable to make sense of the errors in the output in order to correct them.

Accordingly, a need exists for a handwriting recognition technique that can avoid or minimize these limitations and at the same time present the information in a format which allows the user to correct any errors with direct reference to their intended handwritten input.

DETAILED DESCRIPTION OF THE PREFERRED EMBODIMENT

Pursuant to a preferred embodiment, candidate words in support of a handwriting recognition process are developed both through dictionary entry comparisons and most likely string of characters analysis techniques. Words produced through both processes are ultimately selectable as the recognized word. In accordance with a preferred embodiment of the present invention the handwritten alphanumeric input and the recognized word are displayed concurrently and in close juxtaposition to each other. This close juxtaposition allows the user to refer to their original handwritten input when correcting errors in the processing and recognition of the handwritten character input.

Figure 1:
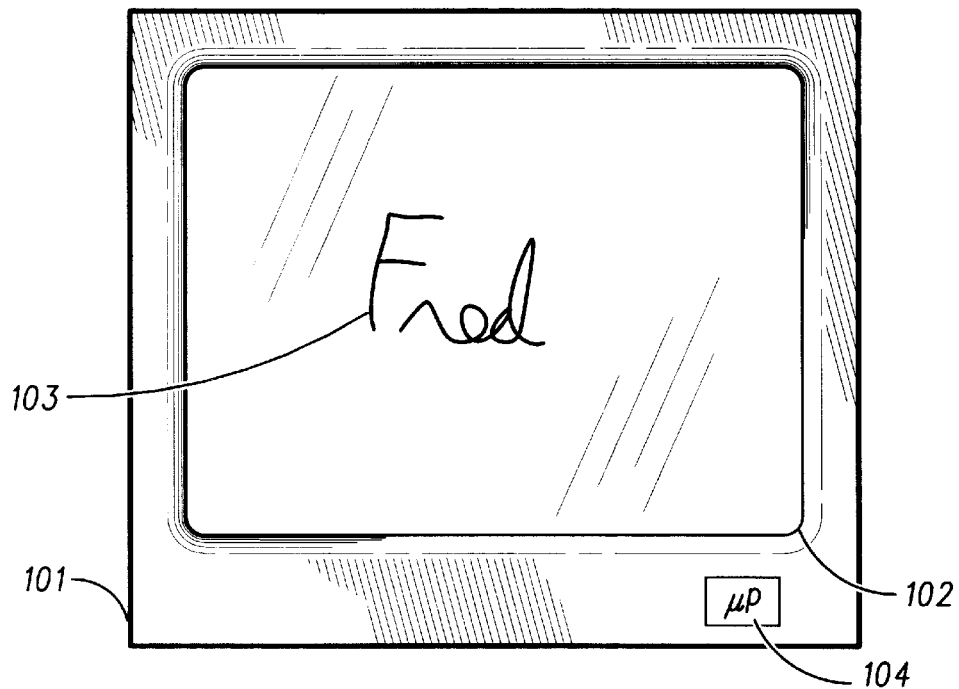
FIG. 1 comprises a top plan view of an illustrative personal digital assistant suitable to support operation in accordance with the invention.

With reference to FIG. 1, a personal digital assistant can be seen as generally depicted by reference numeral 100. The personal digital assistant PDA (100) depicted constitutes a generic representation, and may be comprised, for example, of an EO™ or Newton™ personal digital assistant, as are known in the art. Such devices typically include a housing (101) and a touch screen (102) upon which words (103) can be handwritten using an appropriate hand manipulated stylus. Such devices typically include one or more microprocessors or other digital processing devices. As such, these devices comprise computational platforms that can be readily programmed in accordance with the teachings presented herein. It should be understood that, while such personal digital assistants comprise a ready platform to accommodate the practice of the applicant's teachings, the teachings presented herein may be practiced in a variety of other operating environments as well. Some examples of such environments include computers with digitizing screens or connected to a digitizing input surface or capable of receiving faxed or scanned image input, interactive televisions, or other systems with the ability to capture handwritten input and process it.

Figure 2:
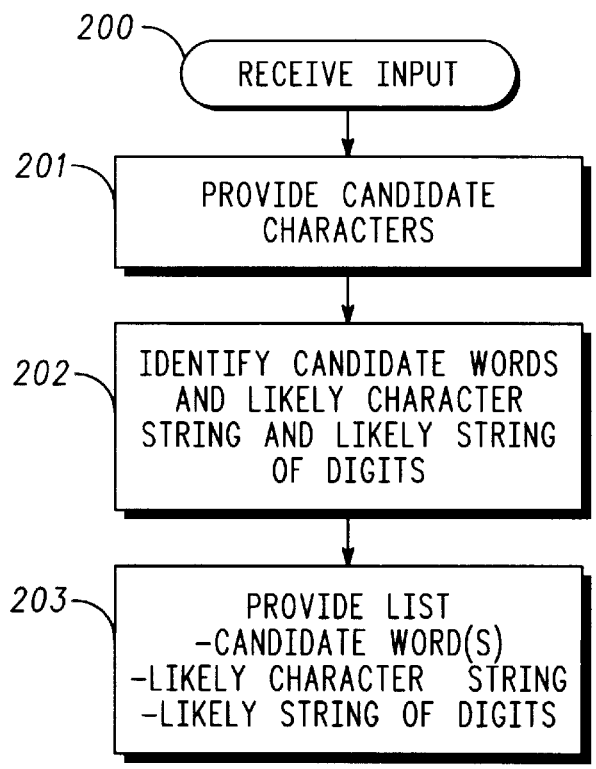
FIG. 2 comprises a flow diagram detailing operation in accordance with the invention.

Referring now to FIG. 2, general operation of the device in accordance with the present teachings will be disclosed.

Upon receiving input (200) in the form of handwriting on the touch sensitive display or touch screen (102), the handwriting recognition method executing in this embodiment on a PDA (100) analyzes the handwriting in order to provide (201) one or more candidate characters that may represent the constituent alphanumeric characters that comprise the handwritten input. Such handwriting analysis techniques are understood in the art, with examples being found in the EO and Newton products mentioned earlier.

Next, the process identifies (202) one or more candidate words by comparing the contents of a dictionary against various combinations of the candidate characters, and providing these various dictionary entries with a corresponding likelihood of being correct. The entries having the highest likelihood are then identified as candidate words. (In some applications, it may be appropriate to compare each entry in its entirety against the candidate characters. In other applications, particularly where processing capabilities are restrictively finite, each dictionary entry may be compared with only part of each combination of candidate characters, unless that partial comparison yields at least a threshold likelihood of accurate representation.) This dictionary based approach is understood in the art, and hence no further description will be provided here.

During this step (202) of identifying candidate words using dictionary entries, the process also identifies a most likely string of characters that represents the input and a most likely string of numeric characters, consisting in one preferred embodiment of a most likely string of digits, which represents numbers and/or punctuation selected from the set of digits 0 to 9 and common numerical punctuation such as $ and %. Accordingly, a string of characters is developed wherein each individual candidate character so identified has an individual high likelihood of accuracy. A second string of numeric digits and punctuation is developed wherein each individual candidate digit or punctuation so identified has an individual high likelihood of accuracy. Importantly, the development of these two strings, the most likely character string and the most likely string of digits (numeric or punctuation), are conducted independent of any dictionary entries. No comparisons are made to dictionary entries when identifying either the most likely character string or the most likely string of digits.

Although dictionary entries are not utilized, in this particular embodiment, the applicant does take into account, for the purposes of developing the most likely character string, the combinations of individual candidate characters that have a highest probability of being accurate through use of character trigram statistics. By reference to such statistical analysis, for example, the applicant can make use of the fact that the letter combination "QUI" is statistically more likely to occur in English words than is the combination "QXZ." Trigram statistical analysis as used in word recognition is well understood in the art, and hence no further description need be provided here.

So configured, the process identifies (202) candidate words as developed through reference to a dictionary, a likely string that represents a string of characters that individually and in combination, without reference to the dictionary, appear to most likely represent the input, and a likely string that represents a string of digits, numeric or punctuation, that individually and in combination, without reference to the dictionary, appear to most likely represent the input. The process then provides (203) this list of candidate words, the likely character string, and the likely string of digits, numeric or punctuation, for subsequent use.

Figure 3:
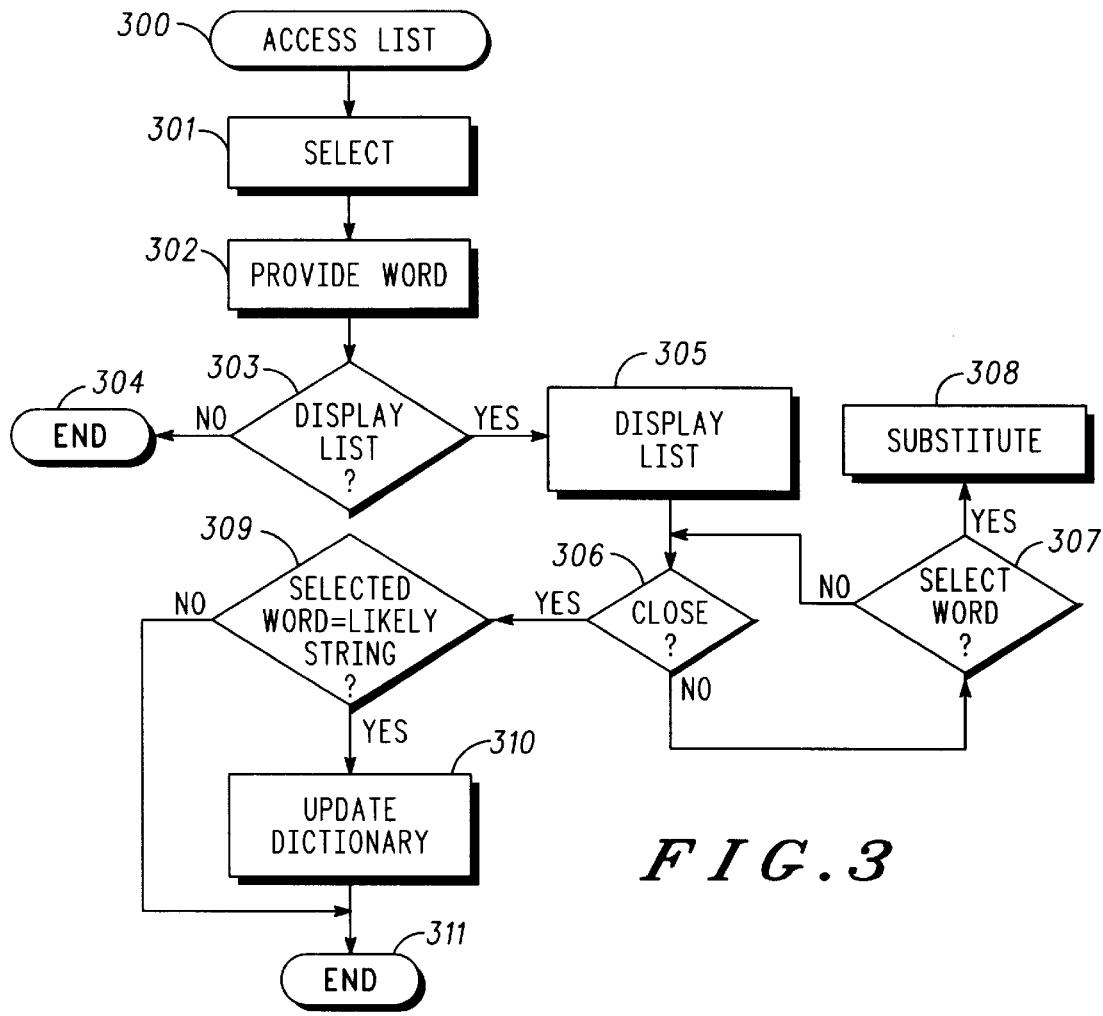
FIG. 3 comprises a flow diagram detailing operation in accordance with the invention.

Referring now to FIG. 3, the personal digital assistant then accesses this list (300) and selects (301) one of the words according to some appropriate metric. For example, in some applications it may be preferable to always (or nearly always) select whichever candidate word has the highest likelihood of being accurate. In other applications, it may be preferable to more heavily weight selection of one or both of the most likely string of characters or the most likely string of digits. Various criteria and techniques for automatically selecting from amongst a plurality of candidate words are understood in the art and need not be presented here in more detail.

Figure 6:
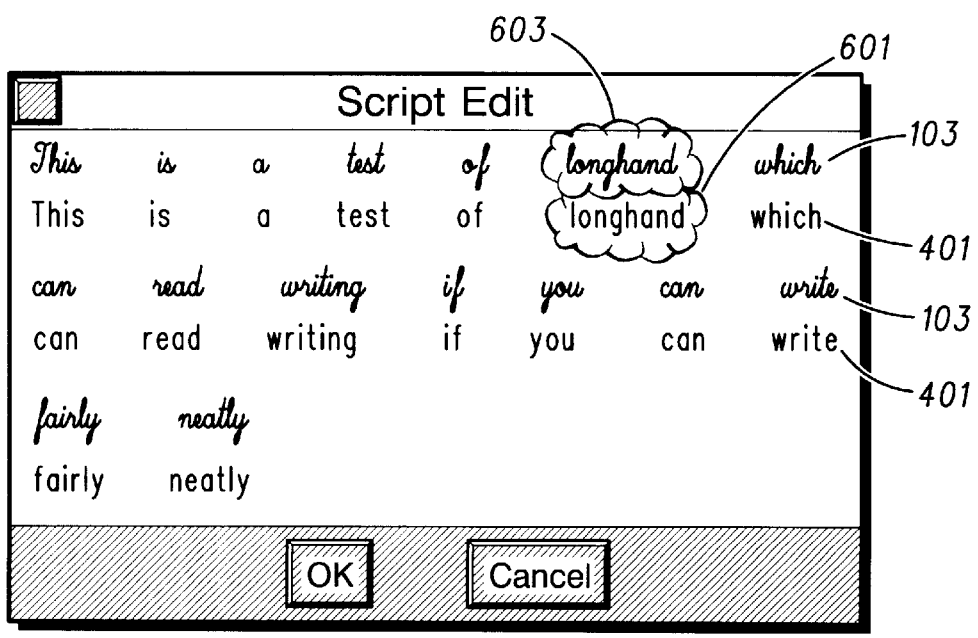
FIG. 6 comprises a top plan view of an illustrative display in accordance with a preferred embodiment of the present invention.

Having selected from the list, the chosen word is then provided (302) to the user. Typically, this selected word will be provided to the user on the display screen (102) referred to earlier. In order to allow the user to refer back to their original handwritten input in case an error in the processing resulted in the wrong chosen word being presented, each chosen word and after "601" insert 601 is displayed immediately below a redrawn copy and after "603" insert 603 of the corresponding original handwritten input. Each chosen word is centered directly below the redrawn input. Furthermore, the original input is redrawn with consideration of the original coordinates of the handwritten input to preserve the relative position of words within a line of input, giving the user a strong visual reminder of the original input. This is illustrated in FIG. 6.

The user may then indicate a desire to have the above mentioned list displayed (303). For example, in existing personal digital assistants, the user can indicate this interest on the display screen. (Of course, if the user does not indicate an interest to display (303) the list, the process concludes (304).) When the user does indicate an interest to have the list displayed the list is displayed (305) on the display screen (102).

Upon displaying the list, the user has a continuing opportunity to close the process (306). Until closure occurs, the process monitors for selection (307) by the user of a different word from the list. Upon selection of a different word from the list, the process substitutes (308) the newly selected word for the previously selected word. The newly selected word is then displayed in close proximity to an image of the original handwritten input. This process can repeat, with subsequent selection of various words, including previously selected and unselected words, until the user eventually closes the process (306).

Upon closing (306), the process determines (309) whether the presently selected word constitutes the most likely string. When true, the process automatically updates the dictionary (310) to include the likely string prior to concluding (311). The user will therefore be assured that the new word will be added to the dictionary and will be available thereafter for comparison with future handwritten input.

Figure 4:
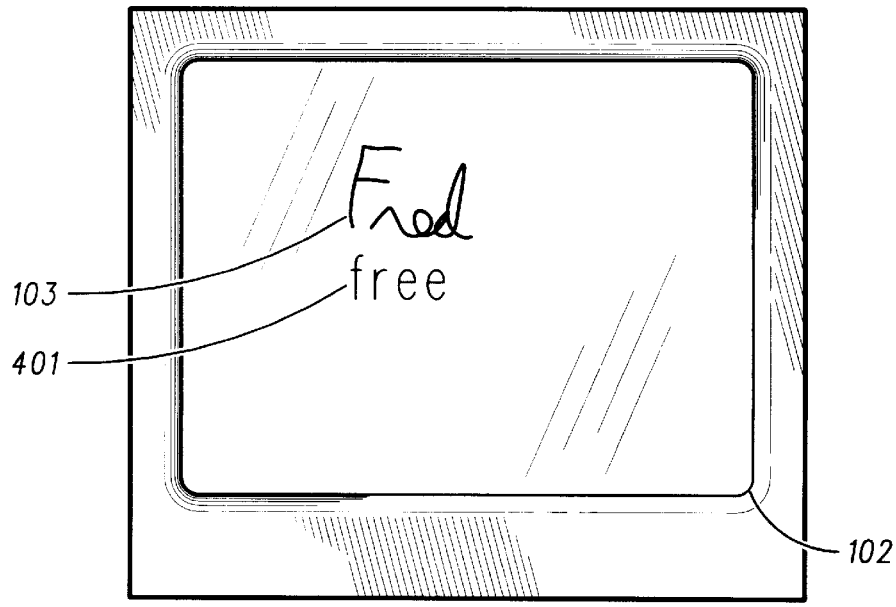
FIG. 4 comprises a top plan view of an illustrative display in accordance with the invention.
Figure 8:
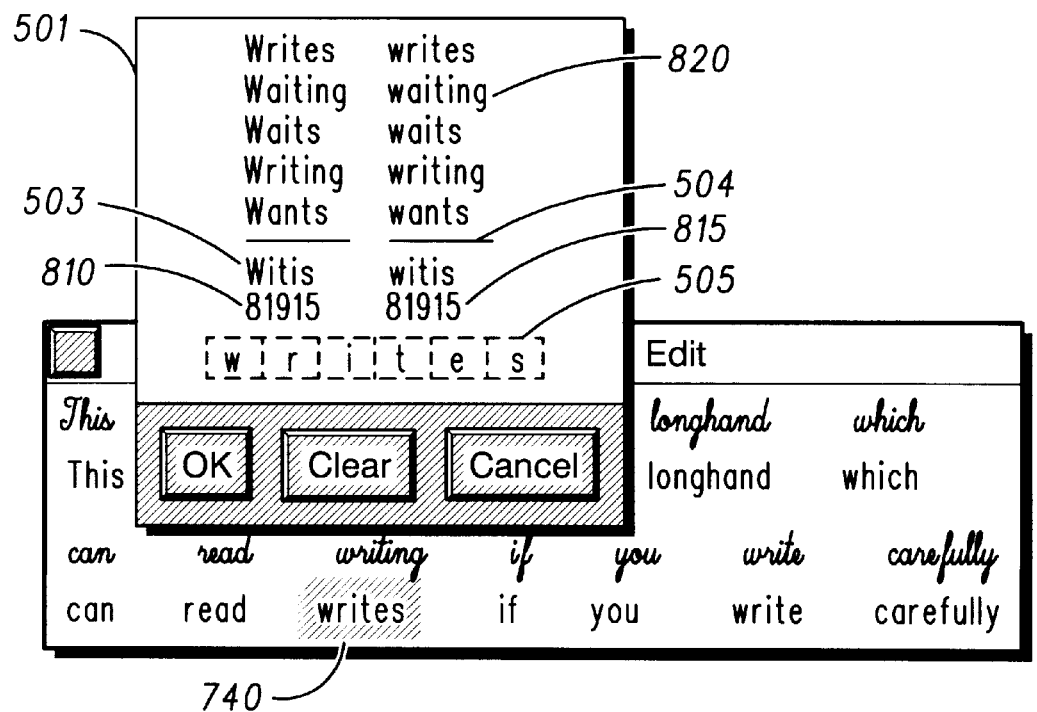
FIG. 8 comprises a top plan view of an illustrative display in accordance with a preferred embodiment of the present invention.

Referring again to FIG. 1, it will be presumed for purposes of an example that a user has entered the handwritten word "Fred" (103) on the touch sensitive display or touch screen (102). This input is analyzed as described above, and a list of candidate words, the most likely character string is provided and in a preferred embodiment the most likely string of digits of numeric or punctuation will be provided as illustrated in FIG. 8. From this list, the process selects a most likely match, and presents this match as depicted in FIG. 4. In particular, in this embodiment, the recognized word "free" (401) appears in close juxtaposition to a representation of the original input (103). As illustrated in FIG. 6 a redrawn copy of the original, and after "603" insert 603 handwritten input is displayed. The chosen word (601) is displayed immediately below the redrawn copy of the corresponding handwritten input (603). Preferably each chosen word (601) is centered below the corresponding handwritten input (603).

Figure 5:
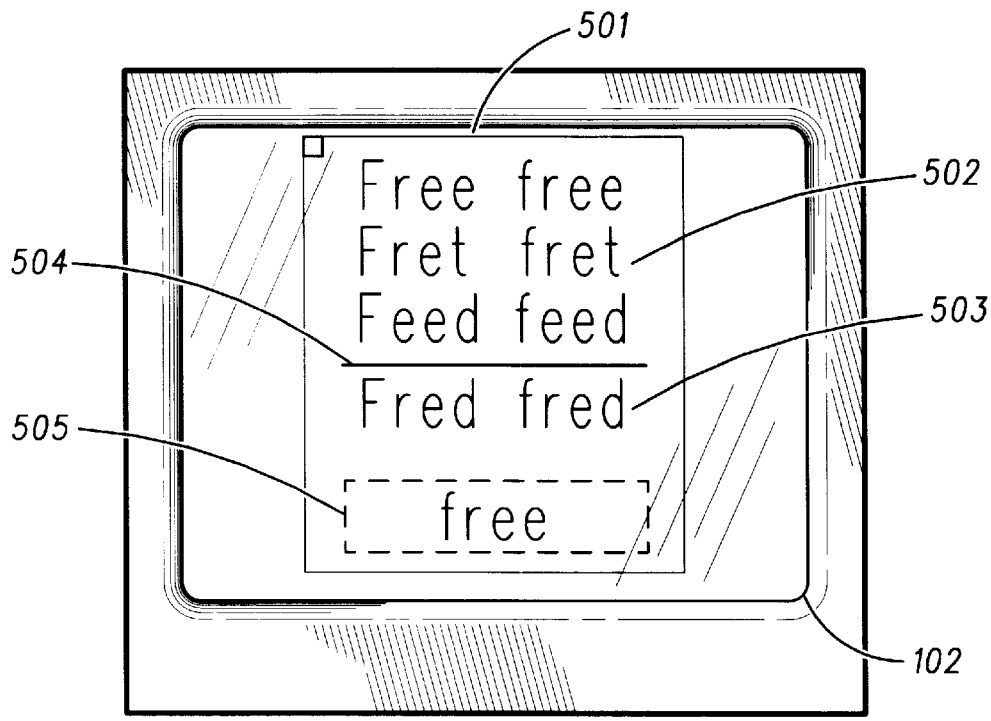
FIG. 5 comprises a top plan view of an illustrative display in accordance with the invention.
Figure 7:
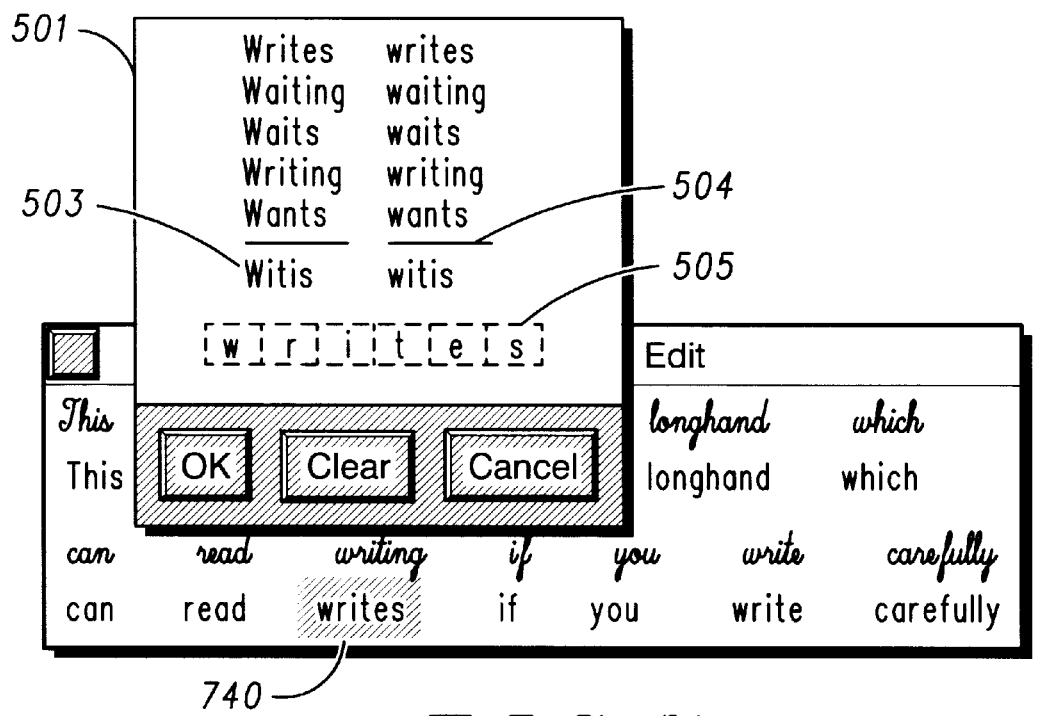
FIG. 7 comprises a top plan view of an illustrative display in accordance with a preferred embodiment of the present invention.

It will now be presumed that the user indicates a desire to see the list. FIG. 5 depicts a display of an example list. In an appropriate window (501), the candidate words that were developed through reference to the dictionary are presented in one portion (502) of the window (501), and as described above and shown in FIG. 7. In this particular embodiment, candidate words are presented in both lower case and initial-letter-capitalized form. In this particular example, the dictionary does not include the word "Fred" and hence the word "Fred" does not appear in this portion (502) of the window (501) and as illustrated in FIG. 7. In a different portion (503) of the window (501), which portion (503), in this embodiment, is separated from the first portion (502) by a line (504), the most likely character string is displayed as described previously. In this example, the most likely character string comprises the word "Fred."

The list is displayed in order of the probability that the items making up the list are correct, with the most likely item presented first. In a preferred embodiment as illustrated in FIG. 8, the likely character string (810) and the likely string of digits (815) (numeric or punctuation) displayed in a separate region of the window (501). The process displaying the likely choices can assess, on the basis of a confidence value indicating how probable it is that the most likely character string (810) or the most likely string of digits (815) are actually correct, whether to display neither, one, or both of these strings. The method for making this determination may vary from embodiment to embodiment to suit the task in question. For example, if the task in question has a high probability that the handwritten input will consist of digits of numeric or punctuation, the process can be set to display a likely string of digits each time the list (820) is requested to be viewed.

The present invention can be set to display more or less options. Five options is convenient number for the user, and almost always contains the correct response. The options are prioritized by their recognition score—a measure generated by the recognizer telling how confident it is in each alternative. The likely character string and likely string of digits are selected based on the same confidence measure generated by the recognizer, such that if the score is below a threshold, the strings are not displayed. The selected likely strings are displayed in order of the character likely string, if present, followed by the likely string of digits, if present.

Finally, in accordance with the preferred embodiment and as illustrated in FIGS. 5,7, and 8, another portion (505) of the window (501) provides a depiction of the presently selected word. If the user were to select the word "Fred," then the characters comprising the word "Fred" would appear in the spaces indicated, thereby presenting "Fred" as the currently selected word (505). The present invention always opens the window with the alternative having the highest confidence value from the recognizer displayed in the character boxes. The currently selected word is always shown in the spaces indicated.

When a likely string of digits is displayed, as in FIG. 8, the numerical or punctual value displayed is not random, but it is the recognizer's best interpretation of the input, assuming that the input is a number. This is calculated for each input, because users may write numbers in line with other input—for example, when writing an address or sending a note containing a phone number. The numerical or punctual values may be displayed as the preferred choice beneath the input if it scores highly enough; if not, it will be displayed only when the user taps to see the word alternatives, or list. The present invention calculates the number interpretation because many numbers look similar to words. For example, "15" looks like the word "is", so the recognizer needs to generate and display both alternatives to the user.

A number of advantages and benefits are attained through provision of the teachings presented above. The described embodiment makes use of both dictionary analysis and most likely string analysis to prepare a list of possible matches, thereby increasing the likelihood that a correct match will be found in the accumulated list.

Also, by segregating the dictionary based candidate words from the most likely strings in the list, greater flexibility is attained. For example, if the user should select a word from the candidate words as developed by reference to the dictionary, a strong presumption can be made that the selected word is spelled properly, and the process can be made to automatically close the window, thereby saving the user the time and trouble of closing the window. On the other hand, although the most likely character strings, when selected by the user, may represent the closest fit in the list to the original input, there exists a reasonable likelihood that the spelling yet remains inaccurate. The window can therefore be left open after selection of the most likely strings in order to better afford the user the ability and opportunity to make minor spelling corrections.

In accordance with the present invention and its preferred embodiments, the handwritten input includes, but is not limited to the following: handwritten input, electronic input, input captured through pressure (such as stamped input); and input that is received electronically (via facsimile, pager, or other device).

Further, the preferred embodiments of the present invention are applicable with modification to various forms of handwritten input including but not limited to alphanumeric input, ideographic input, symbolic input, or other character input.

It will be apparent to those skilled in the art that the disclosed invention may be modified in numerous ways and may assume many embodiments other than the preferred forms particularly set out and described above. Accordingly, it is intended by the appended claims to cover all modifications of the invention that fall within the true spirit and scope of the invention and its equivalents

What is claimed is:

1. A method comprising the steps of:

analyzing handwritten input to provide one or more candidate characters;

comparing at least some entries in a dictionary with at least some combinations of the candidate characters to identify at least one candidate dictionary word that might represent the handwritten input;

determining at least one likely non-dictionary character string from at least some combinations of the candidate characters that has a highest likelihood of representing the handwritten input, the determining step being independent of the comparing step;

identifying a likely string of digits of a numerical or punctuational value; and identifying for presentation in a list of alternate word selections:
the at least one candidate dictionary word;
the at least one likely non-dictionary character string when the likely character string is not one of the candidate words otherwise so provided in the list; and
the likely string of digits.

2. The method of claim 1, wherein the step of analyzing handwritten input to provide a plurality of candidate characters includes the step of determining a likelihood of being correct for at least some of the plurality of candidate characters.

3. The method of claim 1, wherein the step of comparing at least some entries in the dictionary with at least some combinations of candidate characters to identify candidate dictionary words that might represent the input includes the step of comparing all entries in the dictionary with at least some combinations of candidate characters to identify candidate words that might represent the input.

4. The method of claim 3, wherein the step of comparing all entries in the dictionary with at least some combinations of candidate characters includes the step of comparing at least part of each entry with at least part of each combination of candidate characters.

5. The method of claim 1, where in the step of identifying as a likely non-dictionary character string a combination of candidate characters that has a highest combined corresponding likelihood of being correct includes the step of determining a likelihood of accuracy for individual candidate characters.

6. The method of claim 5, wherein the step of identifying as a likely non-dictionary character string a combination of candidate characters that has a highest combined corresponding likelihood of being correct also includes the step of determining which combinations of individual candidate characters has a highest probability of being accurate as determined using character N-gram statistics.

7. The method of claim 1, and further including the step of using the list to provide one selected word.

8. The method of claim 1, and further including the step of displaying the list.

9. A method comprising the steps of:
analyzing handwritten input to provide one or more candidate characters;
comparing at least some entries in a dictionary with at least some combinations of the candidate characters to identify at least one candidate dictionary word that might represent the handwritten input;
determining at least one likely non-dictionary string from at least some combinations of the candidate characters that has a highest likelihood of representing the handwritten input, the determining step being independent of the comparing step;
identifying for presentation a list including:
the at least one candidate dictionary word; and
the likely non-dictionary string when the likely non-dictionary string is not one of the candidate dictionary word otherwise so provided in the list; and
selecting one of the words in the list to provide a selected word.

10. The method of claim 9, and further including the steps of:
receiving input from the user indicating a request to display at least part of the list;
displaying the at least one candidate dictionary word and the likely non-dictionary character string when the likely non-dictionary character string is not one of the candidate dictionary words otherwise so provided in the list.

11. The method of claim 10, and further including the step of:
receiving input from the user indicating a selection of the likely non-dictionary character string;
automatically updating the dictionary to include the likely non-dictionary character string.

12. The method of claim 9, wherein the step of analyzing the handwritten input to provide one or more candidate characters includes the step of determining a likelihood of being correct for at least some of the plurality of candidate characters.

13. The method of claim 9, wherein the step of comparing at least some entries in the dictionary with at least some combinations of candidate characters to identify candidate dictionary words that might represent the input includes the step of comparing all entries in the dictionary with at least some combinations of candidate characters to identify candidate dictionary words that might represent the input.

14. The method of claim 13, wherein the step of comparing all entries in the dictionary with at least some combinations of candidate characters includes the step of comparing at least part of each entry with at least part of each combination of candidate characters.

15. The method of claim 9, where in the step of identifying as a likely non-dictionary character string a combination of candidate characters that has a highest combined corresponding likelihood of being correct includes the step of determining a likelihood of accuracy for individual candidate characters.

16. The method of claim 15, wherein the step of identifying as a likely non-dictionary character string a combination of candidate characters that has a highest combined corresponding likelihood of being correct also includes the step of determining which combinations of individual candidate characters has a highest probability of being accurate as determined using character N-gram statistics.

17. A method comprising the steps of:
analyzing handwritten alphanumeric input comprising a word that includes a plurality of alphanumeric characters to provide a plurality of candidate characters that may correspond to the alphanumeric characters that comprise the word;
automatically accessing a dictionary and comparing at least some word entries in the dictionary with at least some combinations of the candidate characters to identify candidate dictionary words that might represent the word;
automatically identifying as a likely non-dictionary string a combination of candidate characters that has a highest combined corresponding likelihood of being correct without regard to the dictionary;
providing a list of words including (i) at least one of the candidate dictionary words and (ii) the likely non-dictionary string when the likely string is not one of the candidate words otherwise so provided in the list;
selecting one of the words in the list to provide a selected word;
displaying the selected word;
displaying upon a request to display at least part of the list; and
displaying at least one of the candidate dictionary words and the likely non-dictionary string when the likely non-dictionary string is not one of the candidate words otherwise so provided in the list.

18. The method of claim 17, where in the step of identifying as a likely non-dictionary character string a combination of candidate characters that has a highest combined corresponding likelihood of being correct includes the step of determining a likelihood of accuracy for individual candidate characters.

19. A device capable of recognizing and editing handwritten input, comprising:

a touch-sensitive display for receiving handwritten input; and digital processing circuitry programmed to:

analyze the handwritten input to provide one or more candidate characters;

compare at least some entries in a dictionary with at least some combinations of the candidate characters to identify at least one candidate dictionary word that might represent the handwritten input;

determine at least one likely non-dictionary character string from at least some combination of the candidate characters that has a highest likelihood of representing the handwritten input, wherein the process of determining is independent of the process of comparing; and identify for presentation in a list of alternate word selections including:

the at least one candidate dictionary word; and the at least one likely non-dictionary character string when the likely character string is not one of the candidate words otherwise so provided in the list.

* * * * *

UNITED STATES PATENT AND TRADEMARK OFFICE
CERTIFICATE OF CORRECTION

PATENT NO : 6,005,973
DATED : December 21, 1999
INVENTOR(S) : John L. C. Seybold, Chris A. Kortage It is certified that error appears in the above-identified patent and that said Letters Patent is hereby corrected as shown below:

On the title page, item [54] and column 1, line 3
In the title, please insert --and Display-- after the word "Recognition".

Signed and Sealed this

Twelfth Day of September, 2000

Attest:

Q. TODD DICKINSON

*Attesting Officer*  *Director of Patents and Trademarks*